(12) United States Patent
Einoegg et al.

(10) Patent No.: US 11,600,873 B2
(45) Date of Patent: Mar. 7, 2023

(54) HIGH-VOLTAGE ACCUMULATOR

(71) Applicant: Bayerische Motoren Werke Aktiengesellschaft, Munich (DE)

(72) Inventors: Florian Einoegg, Munich (DE); Michael Huber, Munich (DE); Jan Feddersen, Taufkirchen (DE); Andreas Ring, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 421 days.

(21) Appl. No.: 16/577,165

(22) Filed: Sep. 20, 2019

(65) Prior Publication Data
US 2020/0014084 A1    Jan. 9, 2020

Related U.S. Application Data

(63) Continuation of application No. PCT/EP2018/056157, filed on Mar. 13, 2018.

(30) Foreign Application Priority Data

Mar. 22, 2017   (DE) .................. 10 2017 204 763.1

(51) Int. Cl.
*H01M 10/14* (2006.01)
*H01M 10/6556* (2014.01)
(Continued)

(52) U.S. Cl.
CPC ......... *H01M 10/6556* (2015.04); *B60L 50/60* (2019.02); *B60L 58/26* (2019.02);
(Continued)

(58) Field of Classification Search
CPC ......... H01M 10/6556; H01M 10/0481; H01M 10/613; H01M 10/625; H01M 10/647;
(Continued)

(56) References Cited

U.S. PATENT DOCUMENTS

2003/0211384 A1   11/2003   Hamada et al.
2009/0142653 A1*  6/2009   Okada ................. H01M 10/647
                                                              429/120
(Continued)

FOREIGN PATENT DOCUMENTS

CN     101847762 A     9/2010
CN     102422456 A     4/2012
(Continued)

OTHER PUBLICATIONS

PCT/EP2018/056157, International Search Report dated Jun. 15, 2018 (Three (3) pages).
(Continued)

*Primary Examiner* — Christian Roldan
(74) *Attorney, Agent, or Firm* — Crowell & Moring LLP

(57) ABSTRACT

A high-voltage accumulator includes at least one battery module which has at least two battery cells and a cooling module through which a coolant or refrigerant flows and which is provided for cooling the battery cells. The cooling module has a first fluid connection point for coolant or refrigerant. A first fluid channel is provided, which is fluidically connected to the first fluid connection point. The first fluid channel has a cross-section that deviates from a circular shape.

14 Claims, 4 Drawing Sheets

(51) Int. Cl.

| | | |
|---|---|---|
| *H01M 10/613* | (2014.01) | |
| *H01M 10/625* | (2014.01) | |
| *H01M 10/647* | (2014.01) | |
| *B60L 50/60* | (2019.01) | |
| *B60L 58/26* | (2019.01) | |
| *H01M 10/04* | (2006.01) | |

(52) U.S. Cl.
CPC ..... *H01M 10/0481* (2013.01); *H01M 10/613* (2015.04); *H01M 10/625* (2015.04); *H01M 10/647* (2015.04); *H01M 2220/20* (2013.01)

(58) Field of Classification Search
CPC .... H01M 2220/20; B60L 50/60; B60L 58/26; Y02E 60/10; Y02P 70/50; Y02T 10/70
USPC ......................................................... 429/120
See application file for complete search history.

(56) References Cited

U.S. PATENT DOCUMENTS

| | | | | |
|---|---|---|---|---|
| 2014/0193686 A1* | 7/2014 | Siering | ................. | H01M 50/20 429/99 |
| 2015/0082821 A1* | 3/2015 | Ganz | ........................ | B60H 1/00 62/259.1 |
| 2016/0233565 A1* | 8/2016 | Weileder | ............. | H01M 10/625 |

FOREIGN PATENT DOCUMENTS

| | | |
|---|---|---|
| CN | 102934277 A | 2/2013 |
| CN | 103650200 A | 3/2014 |
| CN | 104466296 A | 3/2015 |
| CN | 104882647 A | 9/2015 |
| CN | 204651434 U | 9/2015 |
| CN | 105633505 A | 6/2016 |
| CN | 105977578 A | 9/2016 |
| CN | 205846175 U | 12/2016 |
| DE | 10 2009 015 351 A1 | 9/2010 |
| DE | 10 2013 011 692 A1 | 1/2015 |
| DE | 10 2015 214 661 A1 | 2/2017 |
| DE | 10 2015 115 643 A1 | 3/2017 |
| WO | WO 2014/114545 A1 | 7/2014 |

OTHER PUBLICATIONS

German Search Report issued in German counterpart application No. 10 2017 204 763.1 dated Nov. 3, 2017, with Statement of Relevancy (Nine (9) pages).

Chinese Office Action issued in Chinese application No. 201880005414.X dated Sep. 24, 2021, with English translation (Sixteen (16) pages).

Chinese Office Action issued in Chinese application No. 201880005414.X dated Mar. 14, 2022, with partial English translation (Ten (10) pages).

Chinese Office Action issued in Chinese application No. 201880005414.X dated Jun. 15, 2022, with English translation (Sixteen (16) pages).

* cited by examiner

HIGH-VOLTAGE ACCUMULATOR

CROSS REFERENCE TO RELATED APPLICATIONS

This application is a continuation of PCT International Application No. PCT/EP2018/056157, filed Mar. 13, 2018, which claims priority under 35 U.S.C. § 119 from German Patent Application No. 10 2017 204 763.1, filed Mar. 22, 2017, the entire disclosures of which are herein expressly incorporated by reference.

BACKGROUND AND SUMMARY OF THE INVENTION

The present invention relates to a high-voltage accumulator, in particular for vehicles.

Vehicles with an electric drive or hybrid drive require a high-voltage accumulator with a high storage capacity and a high power density. During rapid charging and discharging of the high-voltage accumulator, considerable amounts of heat are produced, which have to be reliably removed in order to avoid damage to the battery cells of the high-voltage accumulator. This requires an efficient cooling device, which must be integrated in the high-voltage accumulator and thermally coupled to the battery cells.

When building vehicles, the available installation space must be used as efficiently as possible. This also applies in particular to the design of the high-voltage accumulator, i.e., to the arrangement and design of the individual battery modules of the high-voltage accumulator, which in turn consist of multiple battery cells, and also with respect to the cooling device for cooling the battery cells or battery modules.

In principle, the more battery modules that can be accommodated in an existing installation space, the greater the electrical range of the vehicle.

Liquid-cooled cooling devices are usually used for high-voltage accumulators, because they allow great cooling capacities. In this case, each battery module is usually assigned a dedicated plate-shaped cooling module, which is in the best possible thermally conducting contact with the individual battery cells of the respective cooling module. Each cooling module has at least one fluid input and at least one fluid output, by way of which coolant or refrigerant flows into and out of the cooling module. In this case, usually multiple cooling modules are connected to a central feed, by way of which cold coolant or refrigerant is provided. In an entirely analogous way, usually multiple cooling modules are also connected to a central return channel, by way of which coolant or refrigerant that has been warmed is removed.

In various high-voltage accumulator concepts, "central channels", by way of which cold coolant or refrigerant is supplied to multiple cooling modules and by way of which warmed coolant or refrigerant coming from multiple cooling modules is removed, are arranged in the region between individual cooling modules. The installation space required for these central channels is in this case provided at the expense of the installation space available for the arrangement of battery cells.

The object of the invention is to provide a high-voltage accumulator that allows better utilization of the available installation space for battery cells.

The starting point of the invention is a high-voltage accumulator, with at least one battery module (preferably with multiple battery modules). The at least one battery module has at least two battery cells. Preferably, the battery module has more than two battery cells arranged one behind the other. The battery module also has a cooling module, which is flowed through by a coolant or refrigerant and is intended for cooling the individual battery cells of the battery module.

The cooling module has a first fluid connection, intended for coolant or refrigerant. The first fluid connection may be an inflow connection or an outflow connection, by way of which coolant or refrigerant flows into the cooling module or flows out of the cooling module.

An essential idea of the invention is that a first (central) fluid channel, which is in flow connection with the first fluid connection, is provided. If the first fluid connection is an inflow connection, the first fluid channel is a fluid channel by way of which cold coolant or refrigerant is supplied. If the first fluid connection is an outflow connection, the first fluid channel is accordingly a fluid channel by way of which coolant or refrigerant warmed by the battery cells of the battery module is removed.

A basic idea of the invention is that the first fluid channel has a cross section that deviates from a circular shape. If only a relatively narrow but wide gap is available for accommodating the first fluid channel, a sufficiently high volume flow can nevertheless be supplied or removed through a cross section that deviates from a circular shape.

According to a development of the invention, the cooling module has a second fluid connection, by way of which coolant or refrigerant flows out of the cooling module. Preferably, the second fluid connection is in flow connection with a second fluid channel, which likewise has a cross section that deviates from a circular shape. Consequently, the second fluid channel can also be accommodated well in confined installation space conditions.

There are various possibilities with regard to the arrangement of the first and/or second fluid channel. In principle, it would be conceivable to arrange the first and/or second fluid channel, which has a flow cross section that deviates from a circular shape, in the region between two battery modules of the high-voltage accumulator, in a way similar to that known from conventional high-voltage accumulator concepts in which cooling channels with a round flow cross section are arranged in the region between individual battery modules.

Preferably, however, it may be provided that the first and/or second fluid channel is arranged on a side of the battery cells that is facing away from the cooling module. If for example the cooling module of one battery module is therefore arranged in a lower region of the high-voltage accumulator and the battery cells of the battery module are arranged on the cooling module, the first and/or second fluid channel may then be arranged in a region above the battery cells. The aforementioned feature "on a side of the battery cells that is facing away from the cooling module" can be interpreted broadly, and does not necessarily mean that the cooling module has to extend into the region in which the first and/or second fluid channel is arranged. What is meant by it is quite generally that the first and/or second fluid channel is at a distance from the cooling module equivalent to at least the dimension (for example height) of the battery cells.

As an alternative to this, it could also be provided that the first and/or second fluid channel is arranged on a side of the cooling module that is facing away from the battery cells. In the case of this variant, the distance of the first and/or second fluid channel therefore corresponds substantially to the "thickness" of the cooling module.

Both of the last-mentioned variants are therefore distinguished by the fact that the first and/or second fluid channel is not arranged in the region between two battery modules of the high-voltage accumulator, but in a region that is located for example above or below the battery modules, which has the advantage that the distance between two battery modules can be reduced, i.e., that the battery modules can be made larger (for example in the sense of wider) or that possibly even more battery cells can be provided per battery module, which has favorable overall effects on the range of a vehicle fitted with such a high-voltage accumulator.

As already mentioned, the cross section of the first and/or second fluid channel may be substantially a rectangular cross section. However, in this case the side faces of such a fluid channel do not have to define a right angle exactly. It goes without saying that the side faces may be formed as rounded in their transitional region. Such fluid channels can be produced very inexpensively as extruded profiles.

According to a development of the invention, it is provided that a height of the cross section of the first and/or second fluid channel that is measured in a direction perpendicular to the standing surface of the battery cells on the cooling module is less than a width of the cross section of the first or second fluid channel measured in a direction perpendicular thereto. Such a fluid channel may therefore be referred to as a flat tube.

In a way similar to in the case of conventional battery modules, it may be provided that each battery module has two so-called "pressure plates". A first pressure plate is arranged upstream of a first battery cell of the battery module. A second pressure plate is arranged downstream of a last battery cell of the battery module. The individual battery cells are clamped between the two pressure plates. In this case it may be provided that the two pressure plates are clamped together by tensioning elements, which run laterally along the cell stack formed by the battery cells.

According to a development of the invention, the first and/or second fluid channel is not directly in flow connection with the first or second fluid connection. A first connecting channel may be provided between the first fluid channel and the first fluid connection of the cooling module. Accordingly, a second connecting channel may be provided between the second fluid channel and the second fluid connection of the cooling module.

The first or second connecting channel may be formed directly by a channel provided in one of the pressure plates of the battery module. In this case, coolant or refrigerant therefore flows directly in a channel provided in one of the pressure plates.

As an alternative to this, it may be provided that a continuous clearance, in which a separate portion of line that forms the connecting channel is provided, is provided in one of the pressure plates of the battery module. The connecting channel may be for example a flexible tube, which is fitted in a passage provided in one of the pressure plates of the battery module.

According to a development of the invention, the high-voltage accumulator has multiple battery modules, which respectively have a cooling module with an assigned first fluid connection, each of the first fluid connections being in flow connection with the first fluid channel and being supplied with cold coolant or refrigerant by way of the first fluid channel.

In this case it may be provided that first connection flanges protrude laterally from the first fluid channel, each of the first connection flanges being in flow connection with one of the first fluid connections. The first fluid channel consequently forms a central inflow channel, by way of which the individual cooling modules of the individual battery modules are supplied with cold coolant or refrigerant.

In an entirely analogous manner, it may be provided that a central second fluid channel, which is in flow connection with the second fluid connections of the cooling modules of the battery modules, is provided, coolant or refrigerant that has been warmed by the battery cells of the individual battery modules flowing out of the second fluid connections into the second central fluid channel (central outflow channel).

Second connection flanges may protrude laterally from the fluid channel. Each of the second connection flanges is preferably in flow connection with one of the second fluid connections of the cooling modules of the individual battery modules.

According to a development of the invention, all or at least some of the battery modules of the high-voltage accumulator are arranged in pairs, multiple pairs of battery modules being arranged in a row one behind the other. The first or the second central fluid channel or possibly even both central fluid channels may be arranged in a region between the battery modules. The "flow connections" between the first and/or second fluid channel and the first or second fluid connections of the cooling modules of the battery modules then branch away laterally from the first or second fluid channel.

The first or second fluid channel may for example be produced from a lightweight metal material, such as for example an aluminum alloy. Alternatively, other suitable metallic or nonmetallic materials, in particular also plastic, may of course also come into consideration.

The invention is explained in more detail below in conjunction with the drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1B:
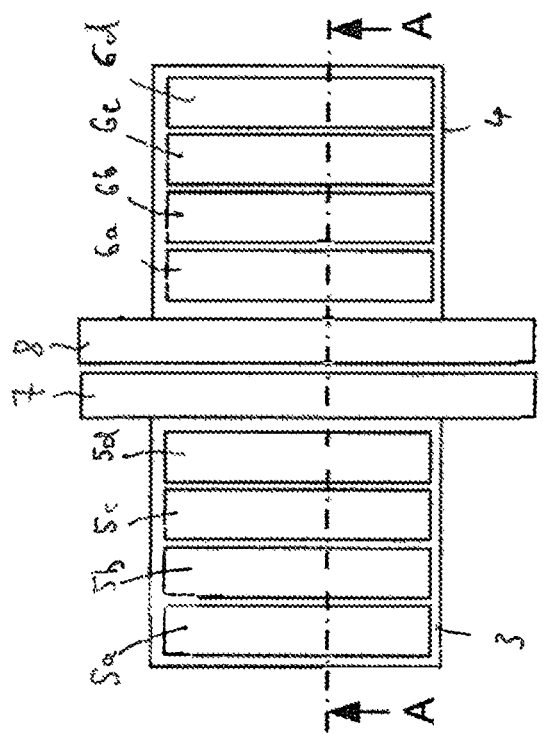
FIGS. 1a and 1b show a conventional high-voltage accumulator concept.

FIG. 1 (conventional battery module arrangement) shows two battery modules 1, 2 of a high-voltage accumulator, which is only indicated here. The battery module 1 has a cooling plate 3, which is provided inside with flow channels and is flowed through by a coolant or refrigerant. In an entirely analogous way, the battery module 2 also has a cooling plate 4. On the cooling plate 3 or 4 of the battery modules 1 and 2, multiple battery cells 5a-5d and 6a-6d are respectively arranged, nested one behind the other.

Each of the cooling plates 3 and 4 has a first fluid connection 3a and 4a, respectively, by way of which coolant or refrigerant flows in, and a second fluid connection 3b, 4b, by way of which coolant or refrigerant that has been warmed by the battery cells 5a-5d or 6a-6d flows away.

Between the two battery modules 1, 2 there runs a (central) first fluid channel (inflow channel) 7 and a second (central) fluid channel (outflow channel) 8. The first fluid channel 7 is connected by way of connecting channels 9a, 9b to the first fluid connections 3a, 4a. The second fluid connections 3b, 4b are connected by way of connecting channels 10a, 10b to the second fluid channel 8.

Figure 1A:
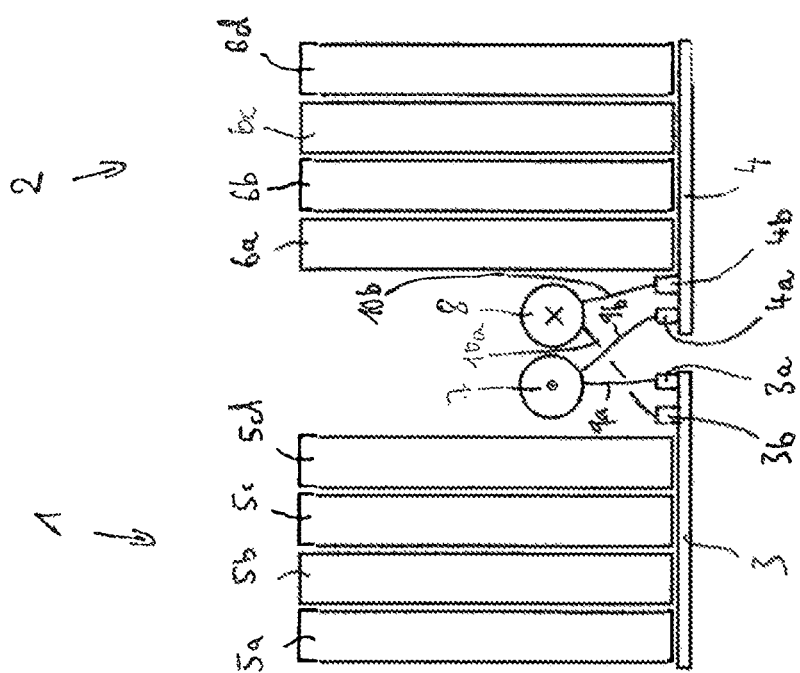

As can be seen from FIG. 1a, some of the connecting channels cross over. Furthermore, the central fluid channels 7, 8 require a comparatively large amount of installation space, which is at the expense of the installation space available for accommodating battery modules.

FIG. 1b shows a plan view of the arrangement represented in FIG. 1a. Depending on the installation space available, central fluid channels with a circular cross section take up a comparatively large amount of installation height or installation width.

Figure 2:
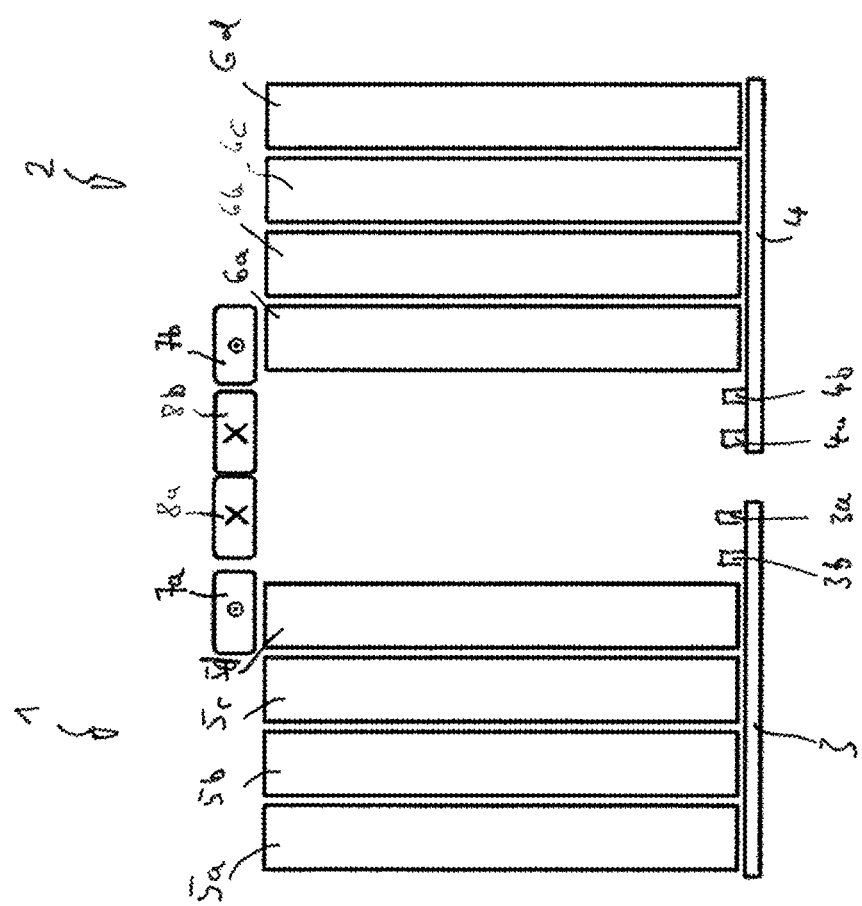
FIG. 2 shows a high-voltage accumulator concept according to the invention in a schematic representation.

FIG. 2 shows a high-voltage accumulator arrangement with likewise two battery modules 1, 2 and two pairs of central fluid channels 7a, 8a and 7b, 8b, respectively, by way of which the cooling plates 3, 4 are supplied with cold coolant or refrigerant and by way of which the warmed coolant or refrigerant flows away. The connecting lines between the central fluid channels 7a, 8a and 7b, 8b and the fluid connections 3a, 3b and 4a, 4b of the cooling plates 3, 4 are not represented here. An essential difference from the concept represented in FIGS. 1a and 1b, in which the fluid channels 7, 8 have a circular cross section, is that in the case of the arrangement represented in FIG. 2 the fluid channels 7a, 8a and 7b, 8b have a rectangular cross section with rounded edges and corners. The fluid channels 7a, 8a and 7b, 8b are therefore formed as flat tubes, which may be of advantage if the fluid channels 7a, 8a and 7b, 8b are to be arranged "above" the battery cells 5a-5d and 6a-6d, respectively, as represented in FIG. 2, and only a comparatively small installation height is available there.

Figure 3:
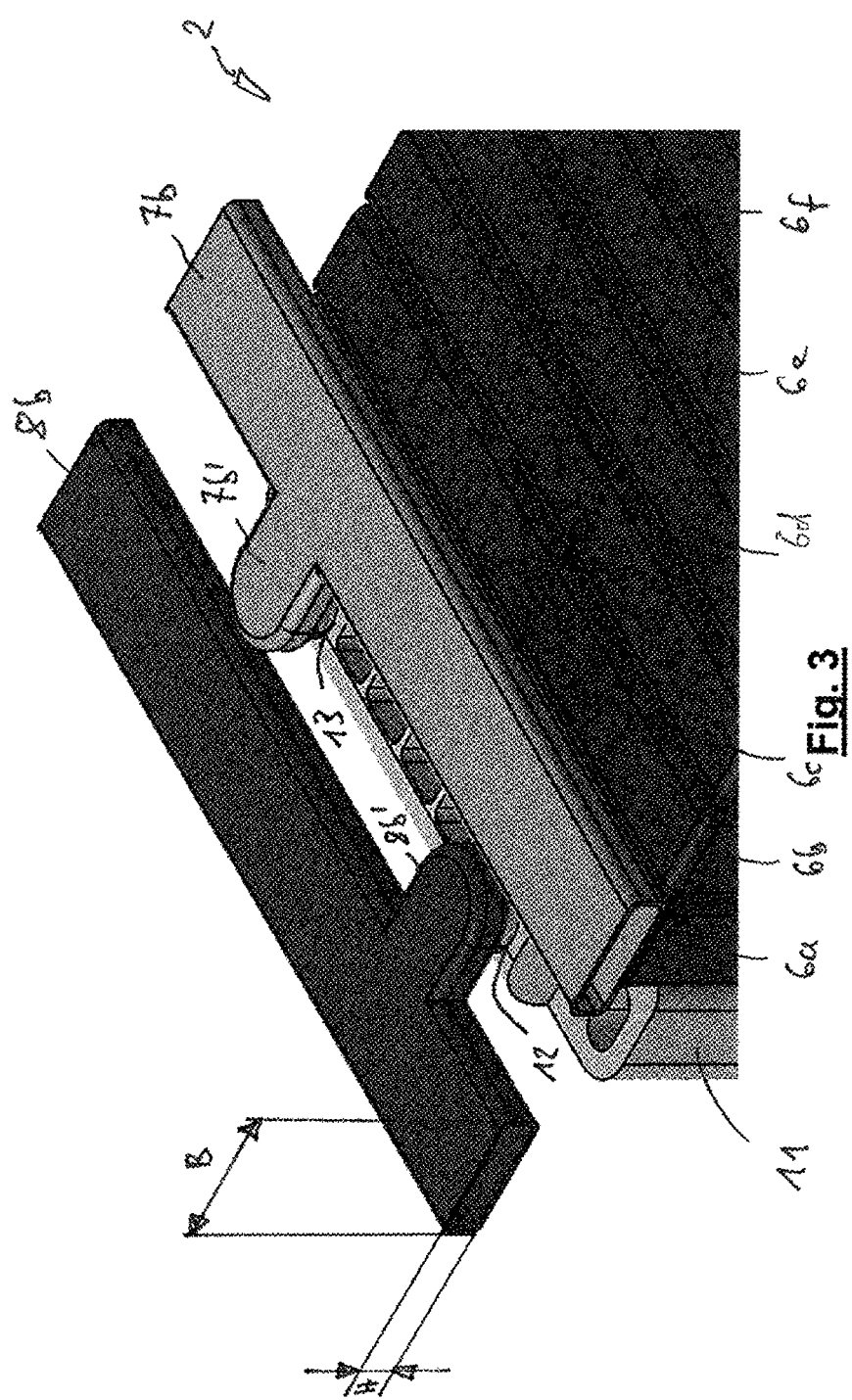
FIG. 3 shows a perspective representation of a specific embodiment according to the invention.

FIG. 3 shows a perspective representation of a battery module 2, which has multiple battery cells, of which battery cells 6a-6f can be seen. Arranged upstream of the first battery cell 6a and downstream of a last battery cell, which is not represented here any more specifically, there is in each case a pressure plate, of which only the front pressure plate 11 is represented here. The two pressure plates are clamped together by way of so-called tensioning bands (not represented) running laterally along the cell stack formed by the battery cells.

As can be seen from FIG. 3, the pressure plate 11 is formed as a hollow profile with multiple through-channels. Two of these through-channels 12, 13 are used for passing coolant or refrigerant through. A first fluid channel 7b is connected by way of a connecting channel, which extends through the through-channel 13 provided in the pressure plate 11, to one of the fluid connections of the cooling plate not represented any more specifically here of the battery module 2.

The second fluid channel 8b is connected by way of a connecting channel, which extends through the through-channel 12 provided in the pressure plate 11, to another of the fluid connections of the cooling plate not represented any more specifically here.

As an alternative to this, it could also be provided that the fluid channels 7b, 8b are directly in flow connection by their connection flanges 7b', 8b' with the through-channels 12, 13 provided in the pressure plate 11, i.e., that the coolant or refrigerant flows directly through the through-channels 12, 13 provided in the pressure plate 11.

It can be clearly seen in the representation shown in FIG. 3 that the width B of the fluid channels 7b, 8b is much greater than the height H of the fluid channels 7b, 8b (here more than twice as great), which is suitable in particular for installation conditions in which little installation space is available above the battery cells.

Figure 4:
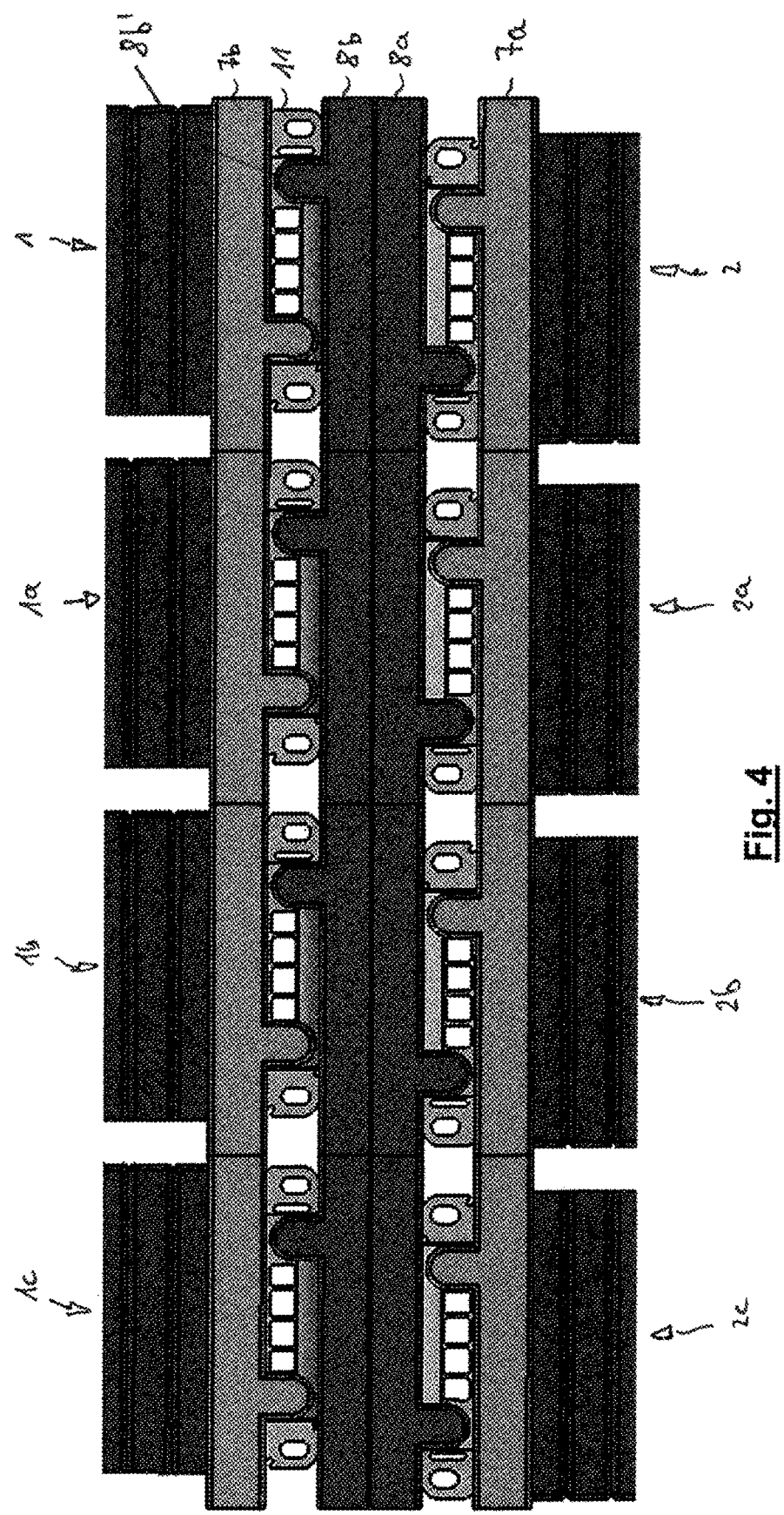
FIG. 4 shows a high-voltage accumulator according to the invention with multiple battery modules arranged in pairs.

FIG. 4 shows a high-voltage accumulator with multiple battery modules 1, 2 and 1a, 2a and 1b, 2b and 1c, 2c arranged in pairs. A pressure plate 11 of each of the battery modules is respectively represented. Multiple through-channels are provided in the pressure plates 11.

As already explained in conjunction with FIG. 3, the central fluid channels 7b, 8b are connected by way of multiple connection flanges to each cooling plate of the battery modules 1, 1a, 1b, 1c.

The central fluid channels 7a, 7b run above the battery modules in the region of the respective battery cell 6a (cf. FIG. 3). The central fluid channels 8a, 8b run above the battery modules in the region between the pressure plates facing one another of the pairs of battery modules.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A high-voltage accumulator, comprising:
 a battery module, wherein the battery module includes:
  at least two battery cells; and
  a cooling plate which has a flow channel disposed within the cooling plate and wherein the flow channel is flowed through by a coolant or a refrigerant which cools the at least two battery cells;
  wherein the cooling plate has a first fluid connection by way of which the coolant or the refrigerant flows into the flow channel; and
 a first fluid channel, wherein the first fluid channel is in flow connection with the first fluid connection, wherein the coolant or the refrigerant is supplied to the flow channel of the cooling plate by the first fluid channel via the first fluid connection, and wherein the first fluid channel has a cross section that deviates from a circular shape;
 wherein the cooling plate has a second fluid connection, wherein the coolant or the refrigerant flows out of the cooling plate via the second fluid connection, and wherein the second fluid connection is in flow connection with a second fluid channel which has a cross section that deviates from the circular shape;
 wherein the first fluid channel and the second fluid channel are disposed above and extend across the at least two battery cells;
 wherein the first fluid channel is in flow connection with the first fluid connection via a first connecting channel and wherein the second fluid channel is in flow connection with the second fluid connection via a second connecting channel; and
 wherein the first connecting channel and the second connecting channel are formed by respective channels provided in a pressure plate of the battery module or are formed by respective lines disposed in the respective channels.

2. The high-voltage accumulator according to claim 1, wherein the cross section of the first fluid channel is substantially rectangular.

3. The high-voltage accumulator according to claim 1, wherein the cross section of the second fluid channel is substantially rectangular.

4. The high-voltage accumulator according to claim 2, wherein the cross section of the second fluid channel is substantially rectangular.

5. The high-voltage accumulator according to claim 1, wherein a height of the respective cross section that is measured in a direction perpendicular to a standing surface of the at least two battery cells on the cooling plate is less than a width of the respective cross section measured in a direction perpendicular thereto.

6. The high-voltage accumulator according to claim 1, wherein the battery module has two pressure plates which are clamped together via a tensioning element and wherein the at least two battery cells are clamped between the two pressure plates.

7. The high-voltage accumulator according to claim 1 further comprising a second battery module which has a second cooling plate with a second first fluid connection in flow connection with a second first fluid channel.

8. The high-voltage accumulator according to claim 1, wherein a connection flange protrudes laterally from the first fluid channel and wherein the connection flange is in flow connection with the first fluid connection.

9. The high-voltage accumulator according to claim 7, wherein the second cooling plate has an additional second fluid connection in flow connection with an additional second fluid channel.

10. The high-voltage accumulator according to claim 1, wherein a connection flange protrudes laterally from the second fluid channel and wherein the connection flange is in flow connection with the second fluid connection.

11. The high-voltage accumulator according to claim 9, wherein the battery modules are arranged in a pair and wherein the respective first fluid channels and second fluid channels are disposed in a region between the battery modules.

12. The high-voltage accumulator according to claim 1, wherein the first fluid channel is metal or plastic.

13. The high-voltage accumulator according to claim 1, wherein the second fluid channel is metal or plastic.

14. A vehicle with a high-voltage accumulator according to claim 1.

\* \* \* \* \*